United States Patent
Schubert et al.

(10) Patent No.: US 6,536,990 B2
(45) Date of Patent: Mar. 25, 2003

(54) DEVICE FOR THE MUTUAL SUPPORT OF TWO CONSTRUCTION MEMBERS

(76) Inventors: Wulf Schubert, Pfalzgrabenweg 30, A-8020 Graz (AT); Bernd Moritz, Alte Poststrasse 12, A-8020 Graz (AT)

( * ) Notice: Subject to any disclaimer, the term of this patent is extended or adjusted under 35 U.S.C. 154(b) by 0 days.

(21) Appl. No.: 09/555,299
(22) PCT Filed: Nov. 26, 1998
(86) PCT No.: PCT/AT98/00286
§ 371 (c)(1), (2), (4) Date: May 26, 2000
(87) PCT Pub. No.: WO99/28162
PCT Pub. Date: Jun. 10, 1999

(65) Prior Publication Data
US 2003/0017006 A1 Jan. 23, 2003

(30) Foreign Application Priority Data
Nov. 28, 1997 (AT) ................................ 2028/97

(51) Int. Cl.⁷ .............................. B60R 19/34; F16F 7/12; E21D 11/08
(52) U.S. Cl. ................. 405/150.1; 405/288; 405/302.1; 52/167.7; 248/644; 248/562; 248/351; 248/636
(58) Field of Search ............................. 405/135, 150.1, 405/153, 288, 294, 302.1; 248/644, 200.1, 636, 562, 568, 569, 570, 351; 403/305, 167, 168, 331, 408.1; 293/132, 133; 52/721.4, 167.7

(56) References Cited

U.S. PATENT DOCUMENTS

| | | | | |
|---|---|---|---|---|
| 3,667,405 A | * | 6/1972 | Roach, Jr. .................. | 109/51 |
| 3,687,499 A | * | 8/1972 | Guilfoyle, Sr. ............. | 403/292 |
| 3,865,418 A | * | 2/1975 | Saxl ........................... | 293/133 |
| 4,047,388 A | | 9/1977 | Howlett | |
| 4,281,487 A | * | 8/1981 | Koller ........................ | 248/351 |
| 4,712,947 A | * | 12/1987 | Thom ......................... | 405/288 |
| 4,976,481 A | * | 12/1990 | Yoshihira .................... | 293/133 |
| 5,015,125 A | * | 5/1991 | Seegmiller .................. | 405/288 |
| 5,215,411 A | * | 6/1993 | Seegmiller .................. | 405/288 |
| 5,484,130 A | * | 1/1996 | Domanski et al. .......... | 405/288 |

FOREIGN PATENT DOCUMENTS

| | | |
|---|---|---|
| DE | 22 38 792 | 2/1973 |
| DE | 24 37 800 | 2/1976 |
| DE | 24 60 598 | 6/1976 |
| DE | 81 30 865.5 | 10/1981 |
| DE | 32 10530 | 10/1983 |
| DE | 297 15 786 | 10/1997 |
| EP | 0 794 350 | 9/1997 |
| FR | 2 349 826 | 11/1977 |
| GB | 2 308 100 | 6/1997 |
| WO | WO 97/13054 | 4/1997 |

* cited by examiner

Primary Examiner—Thomas B. Will
Assistant Examiner—Alexandra K. Pechhold
(74) Attorney, Agent, or Firm—Collard & Roe, P.C.

(57) ABSTRACT

A device for supporting two constructional elements against each other consisting of at least one upset tube arranged between pressure transmitting plates located at the ends of the tube for the purpose of limiting inward and outward bulging. The upset tube is coaxially arranged between two supporting tubes having a smaller length than the upset tube of which the external supporting tube encloses the upset tube at a radial distance.

7 Claims, 2 Drawing Sheets

FIG. 2
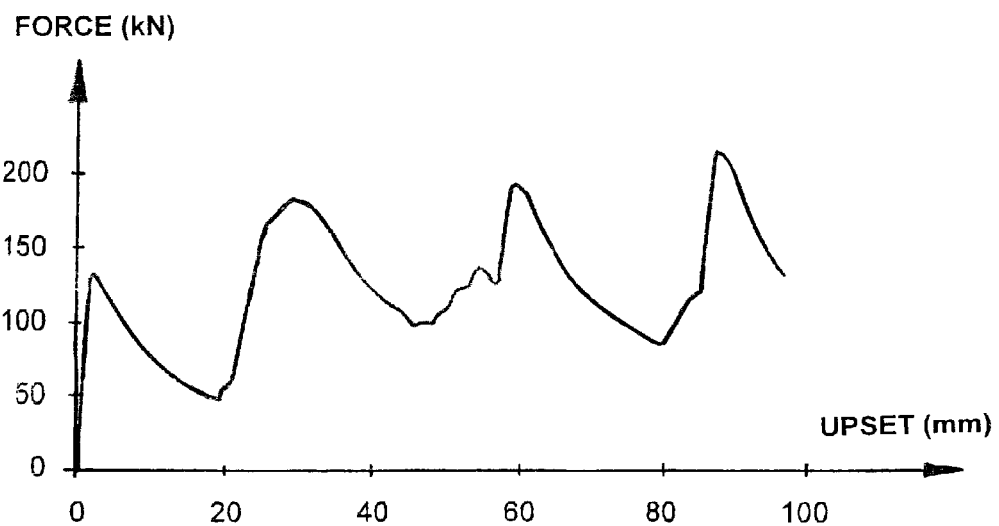
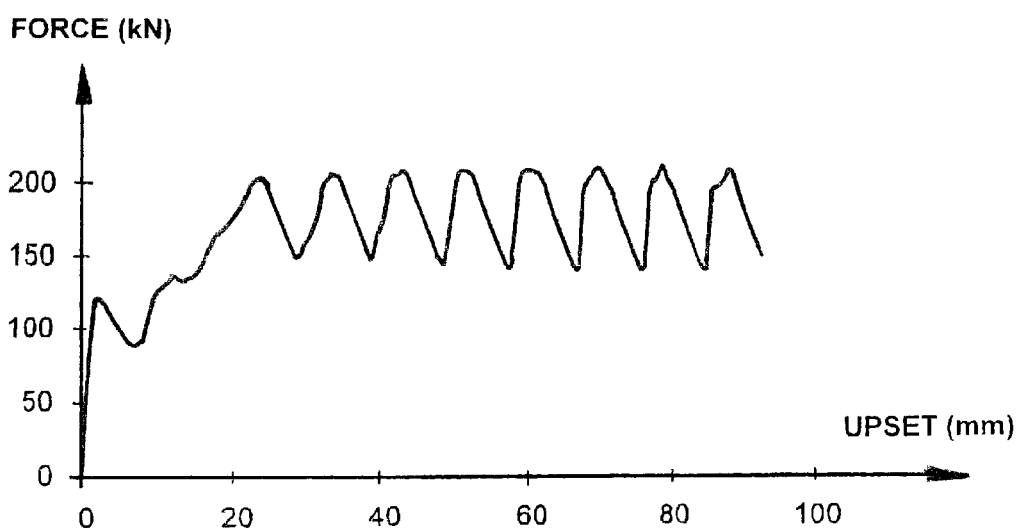
FIG. 3

DEVICE FOR THE MUTUAL SUPPORT OF TWO CONSTRUCTION MEMBERS

TECHNICAL FIELD

The present invention relates to a device for supporting two constructional elements against each other that consists of at least one upset tube arranged between pressure transmitting plates located at its end sides.

BACKGROUND OF THE INVENTION

Dividing the tunnel lining into segments by means of contraction joints positioned parallel to the longitudinal axis of the tunnel is known as a method to manage significant deformations occurring during tunnel excavation in rock of unfavorable characteristics, upset elements inserted into said contraction joints representing a way to ensure adequate bearing capacity of the lining in spite of such contraction joints. The compression forces transmittable via such upset elements, however, must be limited in order to prevent overstressing of the lining. In order to achieve a sufficient resistance to upsetting over the required upsetting path, upset elements consisting of upset tubes inserted between two pressure transmitting plates arranged at the end sides thereof were are already used. In the case of axial loads exceeding the resistance to bulging of the upset tubes, said upset tubes develop ring-shaped bulges, the transmittable compression force decreasing until the walls of the developing ring-shaped fold support each other. Then the transmittable compression force increases until the next bulge, resulting in the next ring-shaped fold, develops, i.e. the process repeats itself. In order to reduce the comparably high load peak prior to the beginning of the bulging process, the initial resistance to upsetting of the upset tubes is reduced by drilling holes into a ring-shaped zone. Even though corresponding dimensioning of the upset tubes allows adaptation to the requirements prevailing from case to case, it would be desirable to improve the upsetting behavior of such upset elements, thus increasing the effective bearing capacity of the lining without having to accept overstressing of the lining, which can consist of sheeting of air-placed or site-mixed concrete, steel structures or tubbing. In this connection, it must also be taken into account that axisymmetrical load patterns, which lead to a further decrease in pressure, cannot be expected.

Upset elements of this type, however, are not only used for tunnel linings but can be used wherever two constructional elements must be supported against each other, defining an adequate resistance to upsetting along an upsetting path as this is, for example, required in the context of the mounting of vehicle bumpers.

SUMMARY OF THE INVENTION

It is thus the object of the present invention to design a device, using simple constructive means, for supporting two constructional elements of the type described above against each other in such a way that the decrease in pressure connected with the bulging of the upset tube is limited and the bearing capacity of the lining consequentially improved.

The invention solves this problem by coaxially arranging the upset tube, in order to limit inward and outward bulging, between two supporting tubes shorter than the upset tube, the external supporting tube enclosing the upset tube at a radial distance.

As the bulging process initiated upon a certain axial load acting on the upset tube can be interrupted by the external supporting tube before development of a ring-shaped fold with walls resting against each other, the decrease in transmittable compression forces caused by the bulging process can also be reduced, which yields a correspondingly higher resistance against deformation. Limitation of the bulging process by the external supporting tube, however, must not lead to inward bulging of the upset tube that reduces its bearing capacity, and therefore inward bulging must be prevented by an internal supporting tube. The radial distance between the internal supporting tube and the upset tube must therefore be kept small. The radial distance between the internal supporting tube and the upset tube must therefore be kept small. The radial distance between the supporting tube and the external upset tube determines the extent of possible outward bulging of the upset tube. The upsetting behavior of the supporting tube can therefore easily be adjusted by varying the ring-shaped gap between the upset tube and the external supporting tube. Limiting the bulging of the upset tube by means of the supporting tubes additionally enforces largely symmetrical bulging patterns, which means that an improved resistance to bulging is also achieved as far as unsymmetrical loads acting on the upset tube are concerned. The length of the upset tube must, of course, exceed the length of the supporting tubes by the required upsetting path.

If no constructive measures are taken in order to define the location of the first bulge developing in the upset tube, the bulge can be expected to form in the area of one of the end sides of the upset tube. Therefore, it is recommendable to divide each of the two supporting tubes into two tube sections of which each is connected with one of the pressure transmitting plates, thus ensuring that the supporting tubes cover the area where the bulge develops regardless of the pressure transmitting plate where bulging initially occurs. I order to define the location of bulging and to reduce the load peaks prior to bulging, it is possible to include in the upset tube a ring section characterized by a smaller resistance to bulging. Said smaller resistance to bulging can be achieved by reducing the cross section by drilling holes into the upset tube or by inclusion of a ring-shaped pre-bulged section.

The bulging behavior can additionally be influenced by filling the ring-shaped spaces between the upset tube and the external supporting tube, on the one hand, and between the upset tube and the internal supporting tube, on the other, with a material consisting, for example, of sand or plastic foam.

Step-by-step reduction, depending on the upset path, of the decrease in transmittable compression forces connected with the bulging process can, finally, be achieved by enclosing the external supporting tube with one or more further supporting tubes arranged coaxially at a radial distance in such a way that the length of the supporting tubes decreases as their radius increases. After consumption of the upsetting path determined by the difference in length between the upset tube and the neighboring external supporting tube, said external supporting tube, now clamped between the pressure transmitting plates, performs the function of an upset tube itself, its bulging behavior being determined by another supporting tube in analogy to the process described above. Thus the resistance to bulging of the upset element increases according to a pre-defined upsetting path, which can, for example, be useful in connection with concrete linings where an increase in bearing capacity resulting from the hardening of concrete is to be taken into account.

BRIEF DESCRIPTION OF THE DRAWINGS

The drawing shows an example of the object of the present invention.

FIG. 2 is a graph showing the upsetting behavior of an upset tube according to the state of the art by means of the force development plotted against the upsetting path.

FIG. 3 is a graph similar to FIG. 2 showing the upsetting behavior of a device according to the present invention.

DETAILED DESCRIPTION OF THE PREFERRED EMBODIMENT

Figure 1:
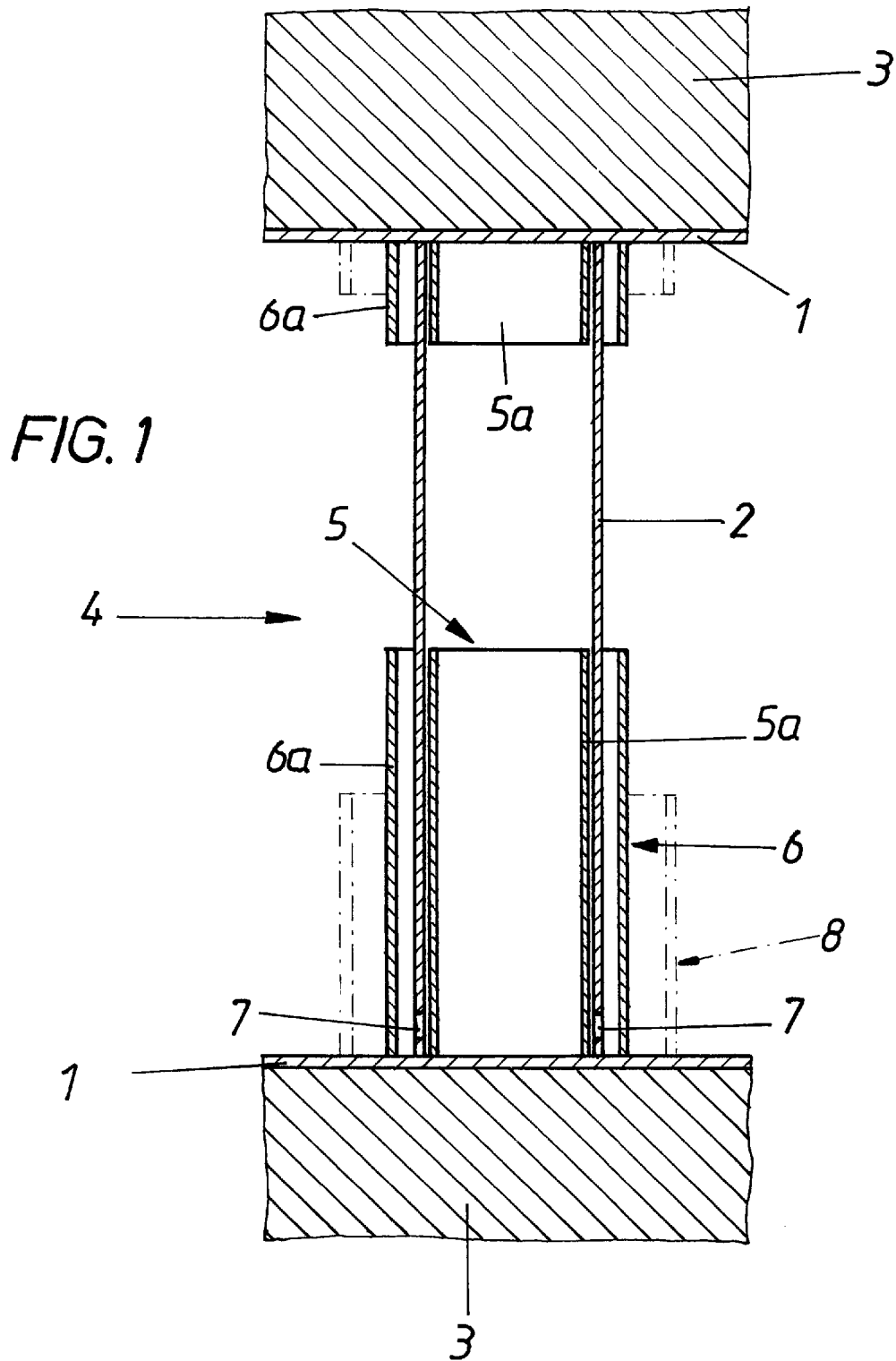
FIG. 1 is a simplified axial section showing a device according to the present invention for supporting against each other two segments of a tunnel lining divided by means of contraction joints arranged in the direction of its circumference.

The device disclosed herein, in the embodiment illustrated, basically consists of two pressure transmitting plates 1 between which an upset tube 2 is arranged. This upset tube 2 serves to support the segments 3 of a tunnel lining that is divided by means of contraction joints 4 between the segments 3 parallel to the longitudinal axis of the tunnel. In contrast to known fixtures of this type, the upset tube 2 is, according to the invention, coaxially arranged between an internal supporting tube 5 and an external supporting tube 6 that are each divided into two sections 5a and 6a, respectively. These tube sections 5a and 6a are each connected with one of the two pressure transmitting plates 1. Drill holes 7 that, reducing the cross section of the tube, determine the initial resistance to bulging of the upset tube 2 are arranged in the area of the bottom edge of the upset tube 2. As soon as the axial load acting on the upset tube 2 via the lining segments 3 exceeds the resistance to bulging, the upset tube 2 begins to develop a ring-shaped bulge in the area of the drill holes 7.

FIG. 2 and FIG. 3 show the force development plotted against the upsetting path. The corresponding measurements were performed using an upset tube of steel St 37 having a height of 400 mm, a diameter of 88.9 mm and a wall thickness of 2.9 mm. The drill holes 7 in the area of the bottom end had a diameter of 15 mm. As shown by both FIG. 2 and FIG. 3, the bulging process commences at a force between 130 and 140 kN, the transmittable force decreasing as a consequence of bulging. In the case of unhindered bulging of the upset tube according to FIG. 2, the transmittable force decreases to approximately 50 kN at an upsetting path of 20 mm until stabilization occurs as a consequence of the walls of the developing ring-shaped fold settling against each other. In the device according to the present invention, on the other hand, the bulging process is interrupted as soon as further bulging of the upset tube 2 is prevented by the external supporting tube 6. In the embodiment underlying FIG. 3, the external tube had a diameter of 108 mm and a wall thickness of 2.9 mm. The internal tube had a diameter of 82.5 mm and a wall thickness of 2.6 mm. Under these conditions, it was possible to reduce the decrease in pressure to approximately 100 kN at an upsetting path of approximately 8 mm. As a consequence of the upset tube being, in the area of the bulge, supported by both the external supporting tube 6 and the internal supporting tube 5, the transmittable force increases until occurrence of another bulge, the resistance to bulging in comparison with the formation of the first bulge being greater because of the absence of further zones of the upset tube with a reduced cross section.

Similarly, the transmittable compression forces in the freely bulging upset tube increase, as shown by FIG. 2, beyond the resistance to bulging during formation of the first bulge. However, as a consequence of the upset tube 2 being controlled by the two supporting tubes 5 and 6, overcoming the resistance to bulging in the device according to the present invention requires a greater force, the decrease in transmittable forces occurring in the context of the next bulging process being once again limited, in comparison with unlimited bulging according to FIG. 2, by the external supporting tube 6. Comparison between FIG. 2 and FIG. 3 thus shows that the transmittable forces can be purposefully increased, with simultaneous adjustment to the respective upsetting path, with the help of a device according to the present invention.

As shown in phantom lines in FIG. 1, a further supporting tube 8 may surround external supporting tube 6 to obtain an increase of the transmittable compression forces in dependence of the upset path. If the facing ends of supporting tube sections 6a come in contact with each other after an upset path has been completed, supporting tube 6, which is now clamped between pressure transmitting plates 1, becomes an upset tube whose bulging behavior is analogously determined by further supporting tube 8.

The details of the device according to the present invention are described in the context of a tunnel lining though its application is, of course, not limited to this particular field. Advantageous application is possible wherever the transmission of certain compression forces over a certain upsetting path must be ensured, e.g. in the context of the mounting of vehicle bumpers.

What is claimed is:

1. A device for supporting two structural elements against each other, which comprises
    (a) an upset tube arranged between two plates transmitting axial pressure to respective ends of the upset tube and
    (b) two coaxial supporting tubes having a shorter length than the upset tube, the upset tube extending between the supporting tubes to limit inward and outward bulging of the upset tube, and an external one of the supporting tubes defining a ring-shaped gap with the upset tube.

2. The device of claim 1, wherein each supporting tube is divided into two tube sections, each tube section being connected to a respective one of the pressure transmitting plates.

3. The device of claim 1, wherein the upset tube comprises a ring-shaped section having a reduced resistance to bulging.

4. The device of claim 1, comprising a further coaxial supporting tube surrounding the external supporting tube at a radial distance therefrom, the lengths of the supporting tubes decreasing as their radius increases.

5. A device for supporting two structural elements against each other, which comprises
    (a) an upset tube arranged between two pressure transmitting plates at respective ends of the upset tube and
    (b) two coaxial supporting tubes having a shorter length than the upset tube, the upset tube extending between the supporting tubes to limit inward and outward bulging of the upset tube, an external one of the supporting tubes defining a ring-shaped gap with the upset tube, an internal one of the supporting tubes also defining a ring-shaped gap with the upset tube, and a yieldable material filling the ring-shaped gaps.

6. The device of claim 5, wherein the yieldable material is sand.

7. The device of claim 5, wherein the yieldable material is a plastic foam.

* * * * *